(12) United States Patent
Wagner et al.

(10) Patent No.: US 7,926,250 B2
(45) Date of Patent: Apr. 19, 2011

(54) PICK-UP DEVICE FOR HARVESTING AND SUPPLYING CUCUMBER PLANTS TO A MOBILE HARVESTING MACHINE

(75) Inventors: Franz Wagner, Pfarrkirchen (DE); Erwin Fleischmann, Simbach (DE)

(73) Assignee: Develey Holding GmbH & Co. Beteiligungs KG, Unterhaching (DE)

( * ) Notice: Subject to any disclaimer, the term of this patent is extended or adjusted under 35 U.S.C. 154(b) by 0 days.

(21) Appl. No.: 12/738,979

(22) PCT Filed: Oct. 31, 2008

(86) PCT No.: PCT/EP2008/009216
§ 371 (c)(1),
(2), (4) Date: Apr. 20, 2010

(87) PCT Pub. No.: WO2009/056337
PCT Pub. Date: May 7, 2009

(65) Prior Publication Data
US 2011/0005186 A1    Jan. 13, 2011

(30) Foreign Application Priority Data
Nov. 2, 2007  (DE) .......................... 10 2007 052 272

(51) Int. Cl.
*A01D 45/00* (2006.01)
(52) U.S. Cl. ........................................ 56/327.1; 171/61
(58) Field of Classification Search ................. 56/327.1, 56/14.5, 119; 171/38, 14, 26, 28, 61
See application file for complete search history.

(56) References Cited

U.S. PATENT DOCUMENTS

| | | | | |
|---|---|---|---|---|
| 2,504,193 | A | * | 4/1950 | Gough et al. ................... 56/124 |
| 2,633,685 | A | * | 4/1953 | Edwards .......................... 171/28 |
| 3,330,363 | A | * | 7/1967 | Greedy ............................. 171/1 |
| 3,340,935 | A | * | 9/1967 | Sandor ............................ 171/14 |
| 3,387,611 | A | * | 6/1968 | Looker .......................... 460/130 |
| 3,387,612 | A | * | 6/1968 | Tillotson ....................... 460/130 |
| 3,518,818 | A |   | 7/1970 | Porter |
| 3,521,710 | A | * | 7/1970 | Tillotson ......................... 171/61 |
| 3,536,140 | A | * | 10/1970 | Looker ............................ 171/61 |
| 3,581,747 | A | * | 6/1971 | Scribner ....................... 460/130 |

(Continued)

FOREIGN PATENT DOCUMENTS

DE             2616449         11/1976

(Continued)

*Primary Examiner* — Árpád Fábián-Kovács
(74) *Attorney, Agent, or Firm* — Smartpat PLC; Axel Nix

(57) ABSTRACT

The pick-up device 1 disposed in the direction of travel in front of a harvesting machine 2 for cucumbers has a circulating conveyor belt 11 having upward jutting spikes 12 made of rubber or elastomeric plastic and further has an associated circulating cover belt 18 having upward jutting transverse moldings 22, which are tilted forward in the direction of circulation. Directly behind the place at which the spikes 12 reach with their tips the lowest point of their path of circulation, a cutting device 24 is active, which cut off the cucumber plants raised with the spikes 12. A sensing roll 30 resting on the ground 9 controls the height position of the pick-up device in such a way that the blades 27, 28 of the cutting device 24 and the tips of the spikes 12 do not penetrate into the ground 9, but always maintain a short distance from the ground. This configuration ensures an operation which is not disturbed by plant pile-up and even permits use in plasticulture.

9 Claims, 3 Drawing Sheets

U.S. PATENT DOCUMENTS

| | | | |
|---|---|---|---|
| 3,603,067 A | | 9/1971 | Wilde |
| 3,942,590 A | * | 3/1976 | Friedel et al. .................. 171/5 |
| 4,234,045 A | | 11/1980 | Porter |
| 4,965,993 A | * | 10/1990 | Butler et al. ................ 56/327.1 |
| 5,077,963 A | * | 1/1992 | Harrison et al. ............ 56/327.1 |
| 5,167,110 A | * | 12/1992 | Reimer ....................... 56/327.1 |
| 5,799,474 A | * | 9/1998 | Ingram ......................... 56/14.5 |
| 5,930,987 A | | 8/1999 | Urich |
| 5,964,081 A | * | 10/1999 | Ingram ......................... 56/14.5 |
| 7,559,188 B2 | * | 7/2009 | Behmlander ............... 56/327.1 |
| 2007/0199293 A1 | | 8/2007 | Barnett |
| 2007/0214764 A1 | | 9/2007 | Behmlander |

FOREIGN PATENT DOCUMENTS

| | | |
|---|---|---|
| EP | 0374889 | 6/1990 |
| EP | 1709859 | 10/2006 |
| GB | 1154814 | 6/1969 |

\* cited by examiner

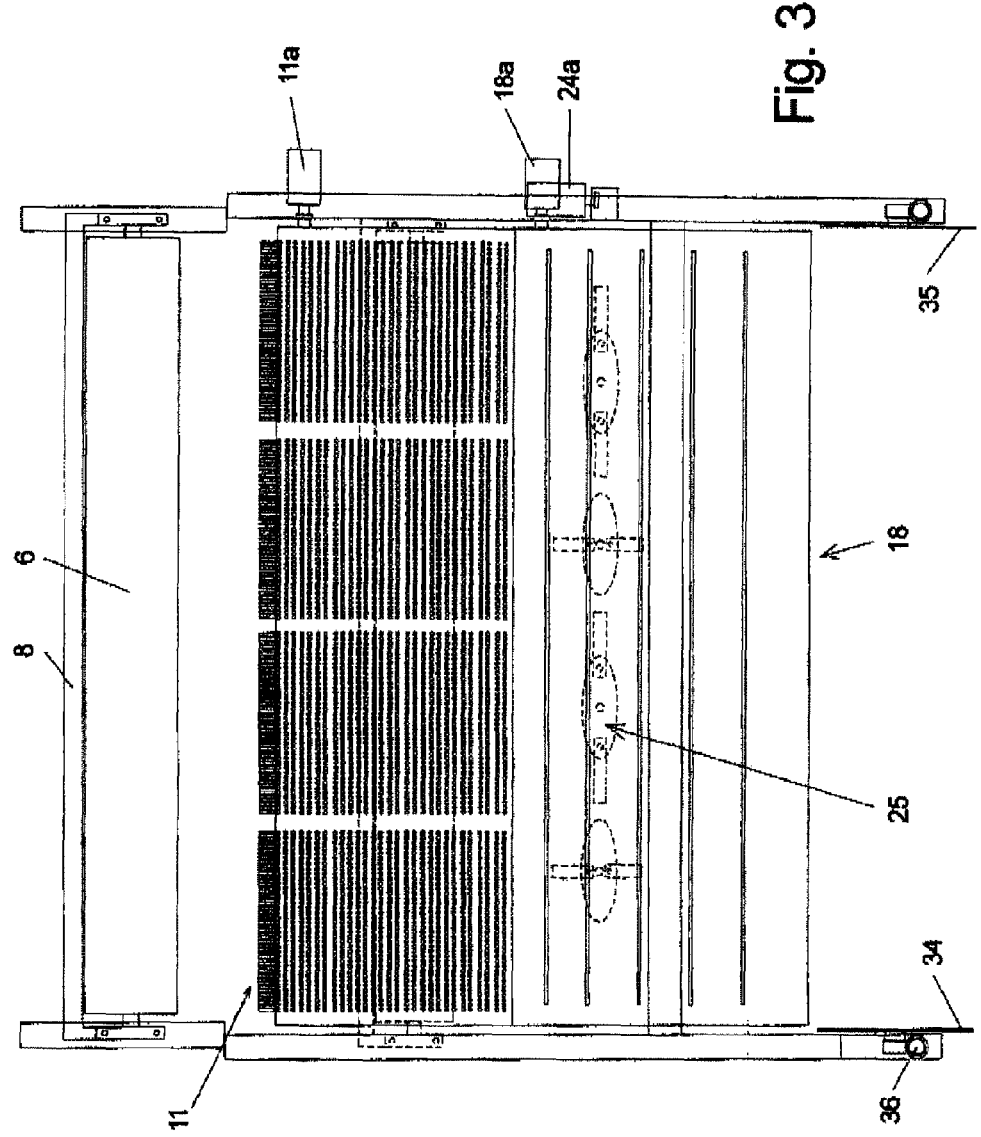

PICK-UP DEVICE FOR HARVESTING AND SUPPLYING CUCUMBER PLANTS TO A MOBILE HARVESTING MACHINE

TECHNICAL FIELD

The invention relates to a pick-up device for harvesting and supplying cucumber plants to a mobile harvesting machine in which the cucumbers are separated from the plants.

BACKGROUND OF THE INVENTION

U.S. Pat. No. 3,518,818 discloses a pickling cucumber harvester comprising a pick-up device which is configured with two lateral wheel disks. The peripheral region of these disks bites into the ground and serves to clear a harvesting path, with a circulating conveyor, tailored to the path width and having tines for raising and conveying the cucumber plants to the harvesting machine, and with a cutting device, extending over the path width, for cutting off the cucumber plants close to the ground directly after the raising, the cutting device being controlled in height by means of a ground sensing device. The envisaged cut-off of the cucumber plants above the ground surface permits use even in non-sandy soils, in which the commonly known cut-off a few centimeters beneath the ground surface (e.g. U.S. Pat. No. 3,603,067) would lead to a transportation of earth into the harvesting machine and hence to considerable disturbances.

Disturbances in the harvesting operation may also be caused by a pile-up of plants in front of the harvesting machine. For yield reasons, moreover, it is necessary to largely prevent the cucumber fruits from being damaged by the harvesting operation. In both respects, the known pick-up device fails to meet the requirements.

A shortcoming of known pick-up devices is their use of a circulating conveyor which is a chain conveyor equipped with rigid metal tines, and that within the conveying track of the circulating conveyor the cucumber plants are lifted continually off the tines, whereupon the cucumber plants, following full retraction of the tines, are no longer forcibly advanced and are not guided. This frequently results in a pile-up of plants in front of the harvesting machine, which causes interruptions to the harvesting operation. Furthermore, it has hitherto not been possible to use a known pick-up device for harvesting purposes in plasticulture. Due to unevenness of the ground and the lack of an appropriate height control for the cutting device and the circulating conveying tines, the plastic sheeting ends up being seized and torn to shreds. In plasticulture, which is particularly sensible in climatically less favored regions from the yield aspect, the cucumber harvest has until now, therefore, had to be carried out expensively by hand.

The object of the invention is hence to provide a pick-up device which is suitable for use with plasticulture, largely prevents interruptions caused by operating disturbances and ensures a gentle treatment of the cucumber plants.

SUMMARY OF THE INVENTION

In one aspect of the invention a pick-up device for harvesting and supplying cucumber plants to a mobile harvesting machine in which the cucumbers are separated from the plants is presented. The pick-up devices comprises two lateral wheel disks, each lateral wheel disk having a peripheral region which bites into the ground and thereby serves to clear a harvesting path. A circulating conveyor, tailored to the width of the harvesting path, is provided. The circulating conveyor comprises tines for raising and conveying the cucumber plants to the harvesting machine. The tines may be formed by spikes made of rubber or elastomeric plastic. A cutting device cuts off the cucumber plants above the ground after they have been lifted. The cutting device extends over the width of the harvesting path. The cutting height is controlled by a ground sensing device, which comprises a sensing roll that extends over the width of the harvesting path. The circulating conveyor further comprises a conveyor belt and a counter-circulating cover belt with transverse moldings made of rubber or elastomeric plastic. The conveyor belt and the cover belt form a feed channel for the cucumber plants that leads up to the harvesting machine.

In this configuration according to the invention, the relatively long sensing roll ensures that, when harvesting takes place on a covering sheet, the sheet is held down to the ground and the height-controlled cutting device is held securely, and over the whole of the path width, at a distance from all local ground elevations. This also applies to the elastic conveyor belt spikes and cover belt moldings, which, as soft and deflectable parts, in any case cause no damage. These elastic parts hereby guarantee a gentle treatment of the cucumber fruits and bring about a forced transport into the harvesting machine, without any pile-up en route.

In one expedient embodiment, the transverse moldings are tilted relative to the cover belt such that their outer end projects in the peripheral direction. A reliable transport of the cucumber plants at the planned speed of conveyance without piling-up is thereby promoted. It is advantageous if the angle of inclination of the cover belt is greater than the angle of inclination of the conveyor belt, so that the cross section of the feed channel increases in the direction of the harvesting machine. This measure also acts to prevent pile-up.

Expediently, a scraper bar is assigned to the roll for cleaning purposes. A sensing roll, which is free from attached earth, ensures a height control which is always precisely tailored to the ground conditions.

Preferably, the cutting device is formed by a rotary blade disk or by two or more laterally adjacent rotary blade disks which jointly cover the path width. The blade disk or each of the two or more blade disks can here be formed by a disk-shaped carrier having at least one radially projecting blade. Where two or more blade disks are used, these are then expediently designed such that the blades of directly adjacent disks are angularly offset relative to each other and project sufficiently far in the radial direction that the cutting widths of the directly adjacent disks overlap. These measures give rise to a relatively simple rotary blade drive, to relatively small blade disks or blade carriers, and to a reliable cut-off even of the cucumber plants in the middle between adjacent blade disks.

In addition, a configuration has proved itself in which the or each blade disk is tilted downward in the direction of travel.

In a preferred embodiment, the pick-up device is attached to the front end of the harvesting machine and can be swung up by means of a hydraulic cylinder supported on the harvesting machine.

BRIEF DESCRIPTION OF THE DRAWINGS

An illustrative embodiment of the invention is explained in greater detail below with reference to a schematic drawing of a pick-up, in which:

FIG. 3 shows the pick-up device in top view.

DETAILED DESCRIPTION

Figure 1:
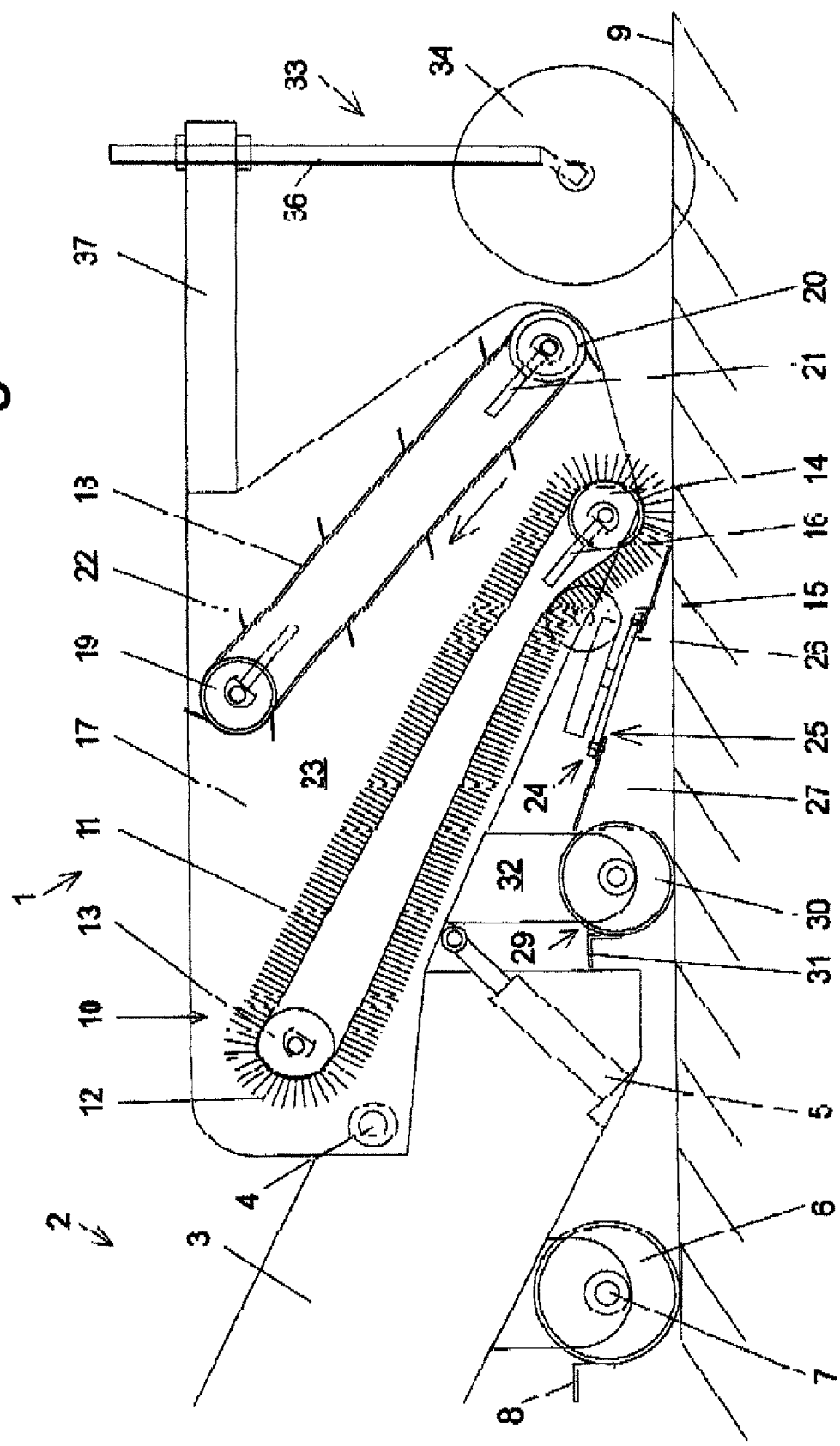
FIG. 1 shows the pick-up device in side view.

The pick-up device 1 is disposed in front of a harvesting machine 2 movable on wheels, only the front end 3 of which is represented. To this front end, the pick-up device 1 is pivotably attached by means of a link 4. A hydraulic cylinder 5 supported on the front end 3 of the harvesting machine 2 is provided to swing up the pick-up device 1.

On the front end 3 of the harvesting machine 2 is mounted a guide roll 6 extending transversely to the direction of travel. The bearings are denoted by 7. The guide roll 6, to which there is assigned a scraper bar 8, rests on the ground 9, which may possibly be covered by a sheet (not represented), and thereby keeps the front end 3 of the harvesting machine 2 at a constant short distance above the ground 9.

The pick-up device 1 has a circulating conveyor 10, which is formed by a conveyor belt 11 equipped with spikes 12 which rise up vertically from the conveyor belt 11, consist of rubber or elastomeric plastic and have a rounded tip. The conveyor belt 11, driven by a hydraulic motor 11a, runs over an upper drive roll 13 and a lower deflection roll 14 and is supported on its outer side by lateral supporting rollers 15. Assigned to the deflection roll 14 is a tensioning station 16, which ensures the correct belt tension.

As indicated by an arrow, the conveyor belt 11 circulates counterclockwise, the arrangement being made such that the spikes 12 have in the deflection region beneath the deflection roll 14 a minimum distance from the ground 9 or else lightly touch it with their deflectable tips. The circulating spikes 12 thereby cause the cucumber plants growing on the ground 9 (not represented) to be taken along and simultaneously raised.

In the frame 17 of the pick-up device 1, apart from the conveyor belt 11, there is also mounted a cover belt 18, which is driven by a hydraulic motor 18a and which, as indicated by an arrow, circulates clockwise around an upper drive roll 19 and a lower deflection roll 20. Here too, a tensioning station 21 ensures the correct wall tension.

The cover belt 18 is provided with projecting transverse moldings 22, which likewise consist of rubber or elastomeric plastic. These transverse moldings 22 are not arranged perpendicularly to the cover belt 22, but are tilted such that they project with their outer end in the direction of circulation. They hence engage better in the conveyed plant stream formed by the feed channel 23 between the two belts 11 and 18, the distance apart of which is adjustable (not represented). The feed channel 23 widens in the direction of conveyance corresponding to the two arrows, since the cover belt 18 is more steeply angled than the conveyor belt 11. The transverse moldings 22 circulate at greater distance from the ground 9, including beneath the deflection roll 20, as can be seen from FIG. 1.

Figure 2:
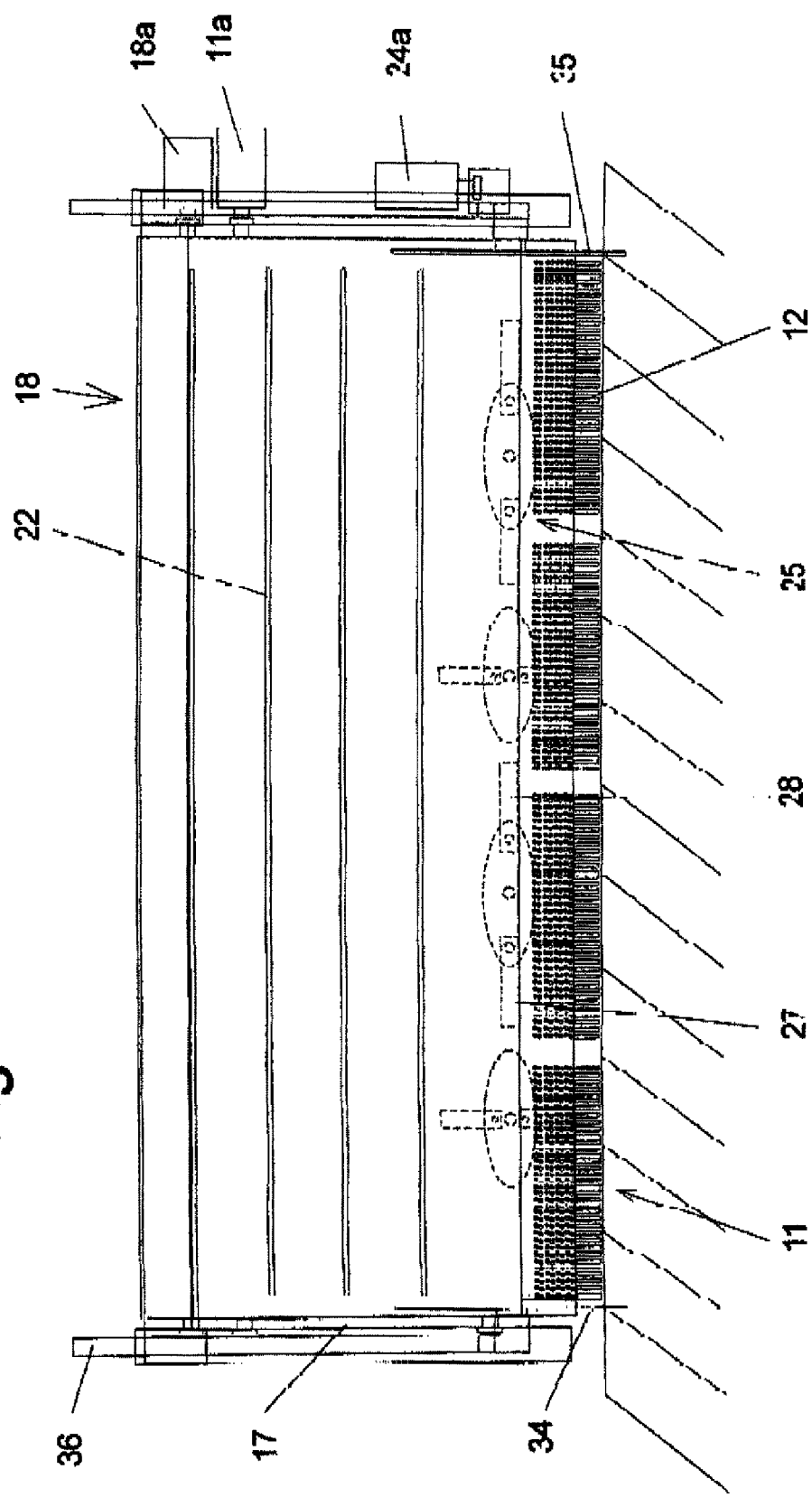
FIG. 2 shows the pick-up device in a view from the front.

Behind the deflection roll 14 of the conveyor belt 11 in the direction of travel there is arranged a cutting device 24, which is driven by a hydraulic motor 24a and is formed by four rotary blade disks 25 arranged side by side on a transverse line and distributed evenly over the path width, as is shown by FIGS. 2 and 3. The four blade disks 25 are of the same configuration and respectively consist of a disk-shaped carrier 26, to which two radially projecting blades 27 and 28 are fitted in diametrically opposing arrangement. The blades 27, 28 of adjacent blade disks 25 are positioned with a 90°-offset orientation, as is shown by FIGS. 2 and 3. It is thereby possible to give each blade disk 25 a cutting width which is somewhat larger than the center distance between the rotation axes of adjacent blade disks 25.

The blade disks 25 are tilted downward in the direction of travel, the radially outer blade ends reaching to close to the ground 7 and to the tips of the spikes 12 rotating around the deflection roll 14, as is shown by FIG. 1. Immediately after being seized by the spikes 12 of the conveyor belt 11, the cucumber plants to be harvested are thus separated from their root part left in the earth.

In order that the blade disks 25 and also the spikes 12, despite the presence of unevenness in the ground, do not penetrate damagingly into the ground 9, nor, in the case of plasticulture, tear into the sheeting present on the ground, an accurate height adjustment in conformity with the ground conditions is necessary. To this end, a ground sensing device 29 is provided, which has a sensing roll 30 having a scraper bar 31. The sensing roll 30 extends substantially over the entire width of the pick-up device 1 and is mounted in two lateral supporting arms 32 jutting down from the frame 17. The sensing roll 30 rests on the ground 9 and thus controls the respective height position of the total pick-up device 1 inclusive of the cutting device 24 and the circulating conveyor 10.

To prevent the raising and onward conveyance of the cucumber plants in the region of the lateral margins of the harvesting path from being hampered by the growing together or entwinement with cucumber plants growing outside the harvesting path, a clear-cutting device 33 is provided on the front end of the pick-up device 1, which defines a harvesting path in accordance with the width of the pick-up device. This clear-cutting device 33 consists of two lateral wheel disks 34 and 35, which are vertically arranged and longitudinally directed and have peripheral edges acting in the manner of a sickle. The wheel disks 34, 35 are mounted on vertical bearing posts 36, which, for their part, are mounted in a height-adjustable manner in supporting arms 37 projecting from the frame 17. According to FIG. 1, the bearing posts 36 are set such that the wheel disks 34, 35 penetrate a few centimeters into the ground 9.

The wheel disks 34 and 35, with their sharp-edged periphery, hence manage to cut through the cucumber plants, so that they clear a harvesting path whose width corresponds to the distance between the two wheel disks 34, 35.

The above-described pick-up device 1 has been built as a prototype and successfully tested, whereupon the suitability also for cultivation sheeting, the insusceptibility to pile-up-induced operating disturbances, and the gentle treatment of the cucumber fruits have been proven. In this context, the following values were central:

| | |
|---|---|
| Harvesting path width: | 2.0 m, |
| Length of the spikes 12: | 5.0 cm, |
| Diameter of the spikes 12, external: | 5.5 mm, |
| Diameter of the spikes 12, at the base | 6.5 mm, |
| Center-to-center spacing of the spikes 12, transversely: | 15 mm, |
| Center-to-center spacing of the spikes 12, longitudinally: | 10 mm, |
| Height of the transverse moldings 22: | 5.0 cm, |
| Angle of inclination of the transverse moldings 22: | 40°, |
| Dimension of feed channel 23, bottom: | 5.0 cm, |
| Dimension of feed channel 23, top: | 11.0 cm. |

| Reference symbol list | |
|---|---|
| 1 | pick-up device |
| 2 | harvesting machine |
| 3 | front end (of 2) |
| 4 | link |
| 5 | hydraulic cylinder |
| 6 | guide roll |

-continued

Reference symbol list

| | |
|---|---|
| 7 | bearing |
| 8 | scraper bar |
| 9 | ground |
| 10 | circulating conveyor |
| 11 | conveyor belt |
| 11a | hydraulic motor (for 11) |
| 12 | spikes |
| 13 | drive roll |
| 14 | deflection roll |
| 15 | supporting rollers |
| 16 | tensioning station |
| 17 | frame |
| 18 | cover belt |
| 18a | hydraulic motor (for 18) |
| 19 | drive roll |
| 20 | deflection roll |
| 21 | tensioning station |
| 22 | transverse moldings |
| 23 | feed channel |
| 24 | cutting device |
| 24a | hydraulic motor (for 24) |
| 25 | blade disk |
| 26 | disk-shaped carrier |
| 27 | blade |
| 28 | blade |
| 29 | ground sensing device |
| 30 | sensing roll |
| 31 | scraper bar |
| 32 | supporting arm |
| 33 | clear-cutting device |
| 34 | wheel disk |
| 35 | wheel disk |
| 36 | bearing posts |
| 37 | supporting arm |

The invention claimed is:

1. A pick-up device for harvesting and supplying cucumber plants to a mobile harvesting machine in which the cucumbers are separated from the plants, comprising:
    two lateral wheel disks, each lateral wheel disk having a peripheral region which bites into the ground and thereby serves to clear a harvesting path;
    a circulating conveyor, tailored to the width of the harvesting path, the circulating conveyor comprising tines for raising and conveying the cucumber plants to the harvesting machine, the tines being formed by spikes made of rubber or elastomeric plastic;
    a cutting device for cutting off the cucumber plants above the ground, the cutting device extending over the width of the harvesting path;
    a ground sensing device configured to control the height of the cutting device, the ground sensing device comprising a sensing roll which extends over the width of the harvesting path;
    wherein the circulating conveyor further comprises a conveyor belt and a counter-circulating cover belt with transverse moldings made of rubber or elastomeric plastic, and
    wherein the conveyor belt and the cover belt form a feed channel for the cucumber plants, leading up to the harvesting machine.

2. The pick-up device as in claim 1, wherein the transverse moldings of the counter-circulating cover belt with transverse moldings are tilted relative to the cover belt such that their outer ends project in the direction of circulation.

3. The pick-up device as in claim 1, wherein the cover belt has an angle of inclination which is greater than an angle of inclination of the conveyor belt, whereby the cross section of the feed channel increases in the direction of the harvesting machine.

4. The pick-up device as in claim 3, wherein a scraper bar is assigned to the sensing roll for cleaning purposes.

5. The pick-up device as in claim 1, wherein the cutting device comprises a rotary blade disk or two or more rotary blade disks which are distributed over the width of the harvesting path.

6. The pick-up device as in claim 5, wherein the rotary blade disk or the two or more rotary blade disks comprise a disk-shaped carrier having at least one radially projecting blade.

7. The pick-up device as in claim 6, comprising two or more blade disks, wherein the blades of directly adjacent disks are angularly offset relative to each other and project sufficiently far in the radial direction that the cutting widths of the directly adjacent disks overlap.

8. The pick-up device as in claim 5, wherein the rotary blade disk or each of the two or more rotary blade disks is tilted downward in the direction of travel.

9. The pick-up device as in claim 1 being pivotably attached to the front end of the mobile harvesting machine, wherein the pick-up device can be swung up by means of a hydraulic cylinder supported on the harvesting machine.

* * * * *